United States Patent [19]
Refregier et al.

[11] Patent Number: 5,175,796
[45] Date of Patent: Dec. 29, 1992

[54] NEURAL SYSTEM OF CLASSIFICATION AND CLASSIFICATION METHOD USING SUCH A SYSTEM

[75] Inventors: Philippe Refregier, Palaiseau; François Vallet, Montigny Le Bretonneux, both of France

[73] Assignee: Thomson-CSF, Puteaux, France

[21] Appl. No.: 684,173

[22] Filed: Apr. 12, 1991

[30] Foreign Application Priority Data

Apr. 24, 1990 [FR] France ............................... 90 05193

[51] Int. Cl.⁵ ..................... G06F 15/18; G06K 9/62
[52] U.S. Cl. ........................................ 395/11; 395/22
[58] Field of Search ............................. 395/11, 21, 22

[56] References Cited

U.S. PATENT DOCUMENTS

4,941,122  7/1990  Weideman ............................ 395/22
5,060,278 10/1991  Fukumizu ............................ 395/11

FOREIGN PATENT DOCUMENTS

0362840  4/1990  European Pat. Off. .

OTHER PUBLICATIONS

Kunihiko Fukushima et al., "Neocognitron: A Neural Network Model for a Mechanism of Visual Pattern Recognition," IEEE Transactions on Systems, Man and Cybernetics, vol SMC-13, No. 5, Sep./Oct. 1983, pp. 826-834.
Proceedings VLSI & Computer Peripherals, Compeuro'89, Hamburg, May 1989, pp. 3/170-172, IEEE, New York, US; N. K. Hasan, et al.: "Orientation Measurement of piece parts using single-layer networks".
IJCNN International Joint Conference On Neural Networks, Washington Jun. 1989; pp. I/251-258, T. Matsuoka, et al.: "Syllable recognition using integrated neural networks."

Primary Examiner—Michael R. Fleming
Assistant Examiner—J. Tryon
Attorney, Agent, or Firm—Oblon, Spivak, McClelland, Maier & Neustadt

[57] ABSTRACT

The disclosure concerns neural networks designed specially for the classification of objects represented by vectors X. If the vectors X include several parameters and if the objects have to be classified in a large number N of classes, the end result is a very large number of interconnections which become difficult to set up physically, are slow in their operation and require lengthy learning phases. The disclosed neural classification system has the particular feature of being constituted on the basis of P neural networks each individually carrying out the classification of objects in only two classes or, at any rate, in a small number of classes only. These networks give probabilities $P_{i,j}$ of membership in a class $C_i$ among two classes $C_i$ and $C_j$. The outputs of these networks are connected to a signal processing module which, through simple functions (implementing linear combinations of the outputs and non-linear standardization functions) establishes, on N outputs, results $P_i(X)$ of classification among the N classes. The learning is done on classifications by pairs of classes, but the post-learning recognition gives classifications among N classes.

26 Claims, 3 Drawing Sheets

NEURAL SYSTEM OF CLASSIFICATION AND CLASSIFICATION METHOD USING SUCH A SYSTEM

BACKGROUND OF THE INVENTION

1. Field of the Invention

The present invention relates to a neural system of classification and to a classification method using a system such as this.

In the field of artificial intelligence, neural networks designate techniques that draw inspiration from the workings of the brain to resolve problems of recognition, classification or optimization. In the field of electronic or optic circuits, they designate a certain type of circuit capable of carrying out transformations on vectors having a large number of components.

2. Description of the Prior Art

A known way of classifying objects represented by electric signals and, more precisely, by vectors of signals applied to the inputs of neural networks lies in the implementation of a so-called learning phase. This phase generally consists of the configuration (namely the programming) of a network, also called a classifier, that fulfills a function of performing the envisaged classification as efficiently as possible by using a set of signals, called a learning base, where the membership of each of these signals in on of the classes in which i is desired to classify them is known. This method is known as supervised learning or learning with teacher.

There are several possible methods of encoding classes to be recognized on the output cells of a neural system (or classification system). In one widely used system, a class is assigned to each of the output cells of the system. The class that will be assigned to the object presented in classification mode will be the one corresponding to that cell which has the greatest output (rule of the maximum). This method is very attractive in its simplicity and in the intuitive aspect related thereto (the rule of the maximum). However, it may have major limitations: this type of encoding may increase the complexity of the problem to be resolved.

This type of encoding may lead to a non-linearly separable approach (of the XOR function type) while there could be a linearly separable type of approach.

The convergence time, during the learning, of a classification algorithm (for example the algorithm of retropropagation of the gradient for the most frequently used neural architecture) is a function of the complexity of the systems. For example, for a linearly separable problem, there can be only about ten iterations while about a hundred iterations are necessary, on an average, for the learning of the XOR logic function. This stresses the importance of the encoding of the output cells of the neural or classification system for the learning process.

However, while a high-performance encoding is used for the learning, in the recognition or classification stage it is often useful to be able to apply the rule of the maximum which notably enables interpreting the outputs as probabilities that the analyzed object will belong to one of the classes.

It may be noted moreover that the more difficult the task to be performed by the neural or classification system, the more likely is it that the structure of the system will be complicated. This point is an important one, especially for the physical construction of a neural or classification system. Indeed, for example in neural systems, the difficulty of their parallel layout lies in the number of interconnections between neurons. With the presently used technology, there is an incompatibility between speed and the number of interconnections (see "DARPA Neural Network Study", AFCEA International Press, February 1988). Predictions based on mean term and long term projections suggest that components with capacities of the order of $10^9$ operations/second will probably not exceed a connection rate of more than $10^6$ interconnections. A promising goal therefore is the simplification of the architecture of the neural or classification systems and, more precisely, the reduction in the number of cells that have to be totally interconnected.

The present invention proposes a solution to the problem of the choice of the encoding of information at the output of the neural network, that enables the use of classification by the rule of the maximum.

SUMMARY OF THE INVENTION

The present invention proposes a neural system designed for the classification of objects in N classes, this system being constituted by P distinct neural networks each capable of giving one result of classification in n classes, n being smaller than N, the P neural networks being capable of undergoing respective, individual learning stages, and a signal processing module being connected to the P neural networks in the post-learning phase of object recognition, to give, on the basis of the outputs of the P neural networks, N outputs of results of classification in N classes.

In other words, the invention proposes to constitute P relatively simple networks (a classification in n classes where n is small and preferably equal to 2), these networks being therefore swift, easy to achieve with present-day technologies and capable of being put through simple learning phases. The learning is performed on the classification in n classes. When the operational phase for a classification of unknown objects is undertaken, it is a signal-processing module connected to the output of the P networks, that determines the results of the classification in N classes on the basis of the results of the classification in n classes.

The processing module is preferably constituted in a simple way by means of circuits effecting linear combinations (essentially sums and differences) of its inputs and circuits carrying out a function of non-linear standardization on the basis of the linear combinations obtained, this function of standardization giving N outputs, the sum of which is constant, each of these N outputs representing or being capable of being interpreted according to a probability of belonging to a respective class among N classes.

In a preferred embodiment, the P neural networks carry out classifications of objects among two classes (every object necessarily has to be classified in one of the two classes). There are enough individual networks for all the N classes to be represented in these elementary classifications. The number P is therefore included between $N-1$ (this is the minimum) and $N(N-1)/2$ (this is the maximum beyond which there would be redundancy in the P networks).

In a preferred embodiment, the P neural networks include output neurons, each constituted by a circuit carrying out a weighted addition function followed by a circuit carrying out a saturating non-linear function (standard constitution of a neuron). At its inputs, the processing module receives the outputs of the weighted addition functions rather than the outputs of the neurons after the saturating functions.

Preferably, the saturating non-linear function at the output of the P networks is a sigmoid function (having the form $e^x/(1+e^x)$) and, preferably, the linear combinations have the form $$g_i(X) = g_j(X) + f_{i,j}(X)$$

where $g_i(X)$ is a linear combination having an index i, $g_j(X)$ is another linear combination having an index j and $f_{i,j}(X)$ is the weighted addition output (before the saturating function) of a neural network for the classification of objects in two classes having indices i and j respectively.

Finally, the non-linear standardization function at the output of the processing module preferably has the form:

$$P_i(X) = e^{g_i(X)}/[\text{sum of the } e^{g_i(X)}, \text{ for } i=1 \text{ to } N]$$

and it is this value $P_i(X)$ that represents a probability that the object X belongs to the $i^{th}$ class in N classes. This value can clearly be processed by the rule of the maximum to give the class of membership.

In short, the invention proposes an approach to the problem of the choice of the encoding of the information at the output of the neural network, thus enabling the use of the classification by the rule of the maximum. It simplifies the task of classification during the learning process by reducing the problem of classification with N classes to problems of classification with a small number of classes, hence problems that are simpler.

The invention makes it possible to:

simplify the physical construction of the neural networks or classification systems;

facilitate the parallelization of the algorithms for their layout in distributed memory parallel computers or in physically different machines (or sites), accelerate the convergence of the learning algorithms by simplification of the task to be resolved;

add on a new class without calling for total re-learning.

Another object of the present patent application is a method of classification of objects by a neural system as defined here above, with P independent networks each enabling one classification in a small number n of classes, wherein:

a learning phase is performed to configure each of the P neural networks on the basis of input vectors and desired results of classification in the groups of n classes without using the processing module;

the operating phases are carried out after learning by using the processing module to obtain the results of classification into N classes from the recognition effected by the P networks.

BRIEF DESCRIPTION OF THE DRAWINGS

The invention will be understood more clearly, and other advantages will appear from the following description, given on a non-restrictive basis, accompanied by the appended drawings, of which.

DETAILED DESCRIPTION OF THE INVENTION

Figure 1:
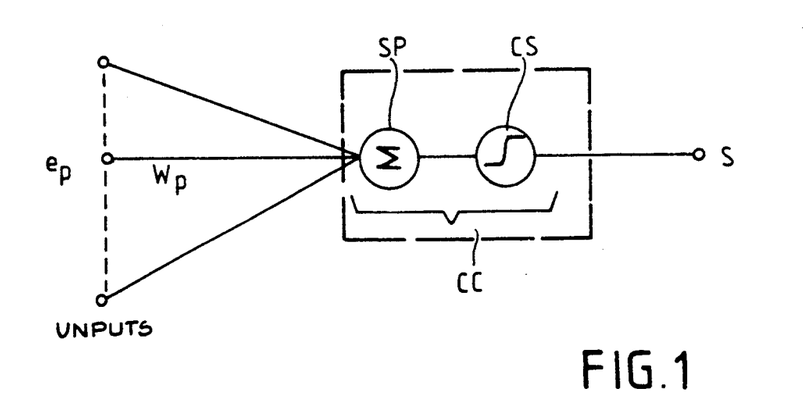
FIG. 1 shows the standard structure of a neuron.

FIG. 1 shows a standard structure of a neuron comprising a certain number of inputs $e_p$, a computation cell CC and an output S. The computation cell CC is formed by a weighted adder SP followed by a threshold circuit CS (sharp threshold function or, more frequently, non-linear function with gradual saturation). $W_p$ is the value of the weight relating the $p^{th}$ input $e_p$ to the computation cell.

The networks of neurons may generally be arranged in layers of neurons. Since all the outputs of the neurons of a same layer may be connected to all the neurons of the following layers, the number of interconnections may be very great once the problem to be resolved becomes complex. In particular, for a recognition problem in which the input vectors include a large number of parameters and in which the number of classes to be recognized is large, the neural network will be very complicated. This will result in manufacturing difficulties and in slow operation and learning.

An aim of the invention is to reduce the complexity of the neural system.

The starting point of the invention is the observation that, in certain cases (i.e. by meeting certain conditions), it is possible to deduce the classification of objects in N classes on the basis of several classifications of these very same objects in classes taken two by two (or more generally on the basis of classifications in n classes where n is smaller than N). To demonstrate this point, the description shall be limited to cases where n=2, but the scope of this principle can be widened to include cases where n is different from two. The invention will generally have no practical value unless n is far smaller than N.

Naturally, the first minimum condition to be met is that the classification of the objects in pairs of two classes must implicate all the N classes. If certain classes are overlooked, there is no chance of its being possible to deduce one classification 1 among N. A simple way to meet this condition is, for example, to make N−1 classifications with two classes: classification between classes $C_1$ and $C_2$, between C and $C_3$ etc. . . . , and finally between $C_{N-1}$ and $C_N$. Other approaches are possible such as, for example, classifications $C_1/C_2$, $C_1/C_3$, etc., or yet others again, that may possibly bring into play a number of classes P greater than N−1, and up to N(N−1)/2.

Figure 2:
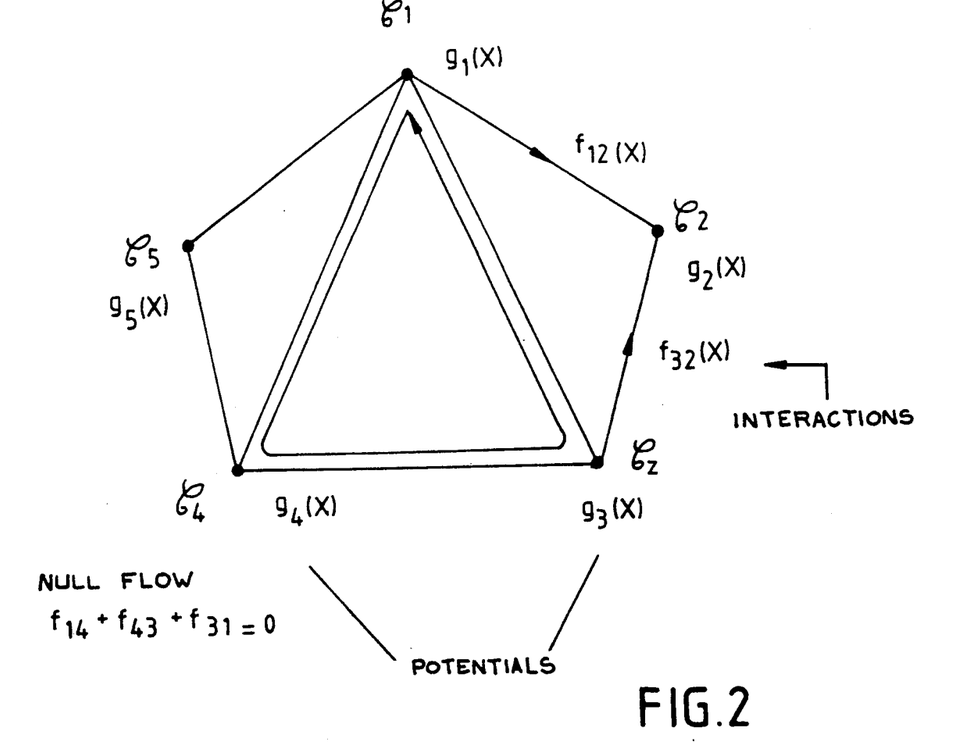
FIG. 2 is a symbolic graph explaining the condition that makes it possible to deduce potential functions $g_i(X)$ at the nodes of the graph from the interactions $f_{i,j}(X)$ the nodes of the graph.

The second condition to be met, which makes it possible to establish the bases of the present invention, is the following one: if, on the basis of a function $f_{i,j}(X)$ bringing two indices i,j into play, it is possible to define functions $g_i(X)$ bringing only one index i into play, it should be possible to establish a graph such as the one of FIG. 2, in which the functions $f_{i,j}(X)$ in some way represent "interactions" among nodes of the graph while the functions $g_i(X)$ represent "potentials" of the nodes of the graph. And the flow of these "interactions" along closed loops of the graph should be null. Indeed, it is then that any potential $g_i$ can be deduced from a potential $g_j$ and from the "interaction" $f_{i,j}$. In the simplest case that can be imagined, the interactions merely represent the algebraic "potential difference" between two nodes, i.e. a potential $g_i$ will be deduced from a neighboring potential $g_j$ by a very simple formula $g_i - g_j = f_{i,j}$.

This amounts to saying that, to enable the deduction of the functions $g_i(X)$ from the functions $f_{i,j}(X)$, it should be possible to express the function $f_{i,j}(X)$, which brings two indices i and j into play, in the form of a difference $g_i(X) - g_j(X)$ of functions each of which brings into play only the index i or the index j, but not both of them.

This simple concept can be applied to a probabilistic type of classification problem wherein a search is made for the "probabilities" $P_i(X)$ that an object X will belong to the class $C_i$ among two possible classes $C_i$ and $C_j$ only.

It is observed, first of all, that the probabilistic approach enables th following equation to be written, by using Bayes' rules:

$$P_{i,j}(X) = P_i(X)/[(P_i(X) + P_j(X)]$$  (1)

In other words, the possibility that the object X will belong to the class $C_i$ if there are only two possibilities of classification $C_i$ and $C_j$ is related directly to the probabilities that the object X belongs to the class $C_i$ or to the class $C_j$ when there are N possible classes.

In the same way:

$$P_{j,i}(X) = P_j(X)/[(P_i(X) + P_j(X)]$$  (2)

is written for the possibility of membership in the class $C_j$ among the only two possible classes $C_i$ and $C_j$.

The result thereof is:

$$P_{i,j}(X)/P_{j,i}(X) = P_i(X)/P_j(X)$$  (3)

and, consequently $$\log[P_{i,j}(X)] - \log[P_{j,i}(X)] = \log[P_i(X)] - \log[P_j(X)]$$  (4)

There are therefore simple relationships between the probabilities of belonging to one out of two classes and the probabilities of belonging to one out of N classes, and these relationships may be expressed in the form of simple differences (of logarithms).

According to the invention, the following procedure is proposed:

by P relatively simple distinct neural networks (classification in two classes each), classification results are established, these classification results being capable of being interpreted as probabilities $P_{i,j}(X)$ which, firstly, are between 0 and 1 (like any probability) and, secondly, are such that $P_{i,j}(X)$ is equal to $1 - P_{j,i}(X)$. These two conditions quite simply express the fact that $P_{i,j}$ is the probabilistic type of result of a classification of the objects X in two classes, with the object obligatorily belonging to one of the two classes. There are P distinct neural networks, and P is between $N-1$ and $N(N-1)/2$. The P networks obligatorily bring all the classes $C_1$ to $C_N$ into play.

$$P_{i,j}(X) = 1 - P_{j,i}(X)$$  (5)

(which, besides, is deduced from (1) and (2)).

then, on the basis of these probabilities $P_{i,j}(X)$, functions $f_{i,j}(X)$ are deduced. These functions $f_{i,j}(X)$ may themselves be expressed in the form of a difference $g_i(X) - g_j(X)$; preferably, the function $f_{i,j}(X)$ chosen is the function $$f_{i,j}(X) = \log(P_{i,j}(X)) - \log(1 - P_{i,j}(X))$$  (6)

which, firstly, is obtained very easily from $P_{i,j}(X)$ and, secondly, is none other than $$f_{i,j}(X) = \log(P_{i,j}(X)) - \log(P_{j,i}(X))$$  (7)

(since $P_{i,j} + P_{j,i} = 1$) $f_{i,j}(X)$ can then be written, following (4):

$$f_{i,j}(X) = \log(P_i(X)) - \log(P_j(X))$$  (8)

which can quite well be expressed in a form of difference $g_i - g_j$ by writing quite simply:

$$g_i(X) = \log(P_i(X)) + H(X)$$  (9)

where $H(X)$ is a function independent of the, index i and necessary for the standardization of the $P_i(X)$.

then, since the probabilities $P_{i,j}$ are given by the P networks, and since it is easily possible to know the functions $f_{i,j}$ from the probabilities $P_{i,j}$ (equation (6)), all that remains to be done is to deduce the $g_i(X)$ by simple flow along the closed loops of the graph 2. Any starting potential (the reference is arbitrary) is taken, for example $g_1(X) = K$. The others are deduced therefrom by linear combinations of the type $g_i(X) = g_1(X) + f_{i,1}(X)$ if $f_{i,1}(X)$ is given by one of the P neural networks, or other linear combinations corresponding to the flows along the closed loops of the graph of FIG. 2 and using those of the values $f_{i,j}$ that are obtained from the P neural networks of classification by two;

finally, having the values $g_i(X)$, all that remains to be done is to convert them into probabilities $P_i(X)$ since $$g_i(X) = \log(P_i(X)) + H(X)$$

$P_i(X)$ is therefore computed by the formula $$P_i(X) = e^{g_i(X) - H(X)}$$  (10)

however, since the aim is that the probabilistic results $P_i(X)$ should really be probabilities of membership in a class among N classes wherein the sum of the probabilities of membership in all the classes is equal to unity, it will be chosen to standardize the function $P_i(X)$ by writing it rather in the form:

$$P_i(X) = e^{g_i(X)}, \text{ for } i=1 \text{ to } N]$$  (11)

which amounts quite simply to making an a posteriori identification of the function $H(X)$.

Consequently, it is seen that there may be a simple way to simplify neural networks of classification when the problem of classification is complex and is likely to lead to networks having an excessively large number of interconnections: rather, what is made is a set of P distinct, elementary neural networks all receiving the same input vectors representing the objects X to be classified and giving probabilistic type results of classifications in two classes. These are simple networks, hence swift and with easy learning. The learning is done on these networks, on the basis of classification results desired in the groups of two classes. Then, when the learning is over and the network goes over to its normal function of recognition and classification, the probabilistic results $P_{i,j}(X)$ of the classifications in two classes are used to transmit them to an electronic processing module that computes the values $P_i(X)$ of the probabilities of belonging to one class among the N classes. The computation is done by means of the functions $f_{i,j}(X)$ which are related to $P_{i,j}(X)$ and the functions $g_i(X)$ which are related to $f_{i,j}(X)$. All that remains thereafter is to use the outputs of this module to determine the classification, for example by using the standard rule of the maximum: the class is the one corresponding to the highest output $P_i(X)$ among the N outputs of the module.

The approach can be extended to the case where n is different from two provided that it is possible to establish, at least approximately, a rule of passage from the probabilities of membership in one class among n classes to the probabilities of membership in one class among N classes.

The intermediate function $f_{i,j}$ that has been chosen by preference and which is $$f_{i,j}(X) = \log(P_{i,j}(X)) - \log(1 - P_{i,j}(X))$$

is particularly promising because it amounts to saying that the probability $P_{i,j}(X)$ is a sigmoid function of $f_{i,j}(X)$:

$$P_{i,j}(X) = e^{f_{i,j}(X)}/[1 + e^{f_{i,j}(X)}] \qquad (12)$$

Now, quite often, the output neurons of the neural networks use sigmoid functions of this type as a saturating non-linear function to establish, on the basis of a weighted sum S, a probabilistic type of classification: the probabilistic output Z (after saturating non-linear function) as a function of the weighted sum Y established by the neurons (before saturating non-linear function) is of the type:

$$Z = e^Y/(1 + e^Y)$$

This amounts to saying that a very simple way to obtain the functions $f_{i,j}(X)$ from the probabilities $P_{i,j}(X)$ is:

to constitute the P elementary neural networks with output neurons in which the saturating non-linear function is a sigmoid function, these output neurons giving the probabilities $P_{i,j}(X)$, and to then take, as a value $f_{i,j}(X)$, the output of the same neuron before the saturating non-linear function that establishes the $P_{i,j}(X)$. This output will then be precisely a value $f_{i,j}(X)$ equal to the difference of the logarithms of $P_{i,j}(X)$ and of $1 - P_{i,j}(X)$ as desired according to the equation (6).

This averts the need to have a specific processing circuit to establish the functions $f_{i,j}(X)$ on the basis of the $P_{i,j}(X)$, before applying these functions $f_{i,j}(X)$ to the inputs of the processing module which computes the $g_i(X)$ then the $P_i(X)$.

Figure 3:
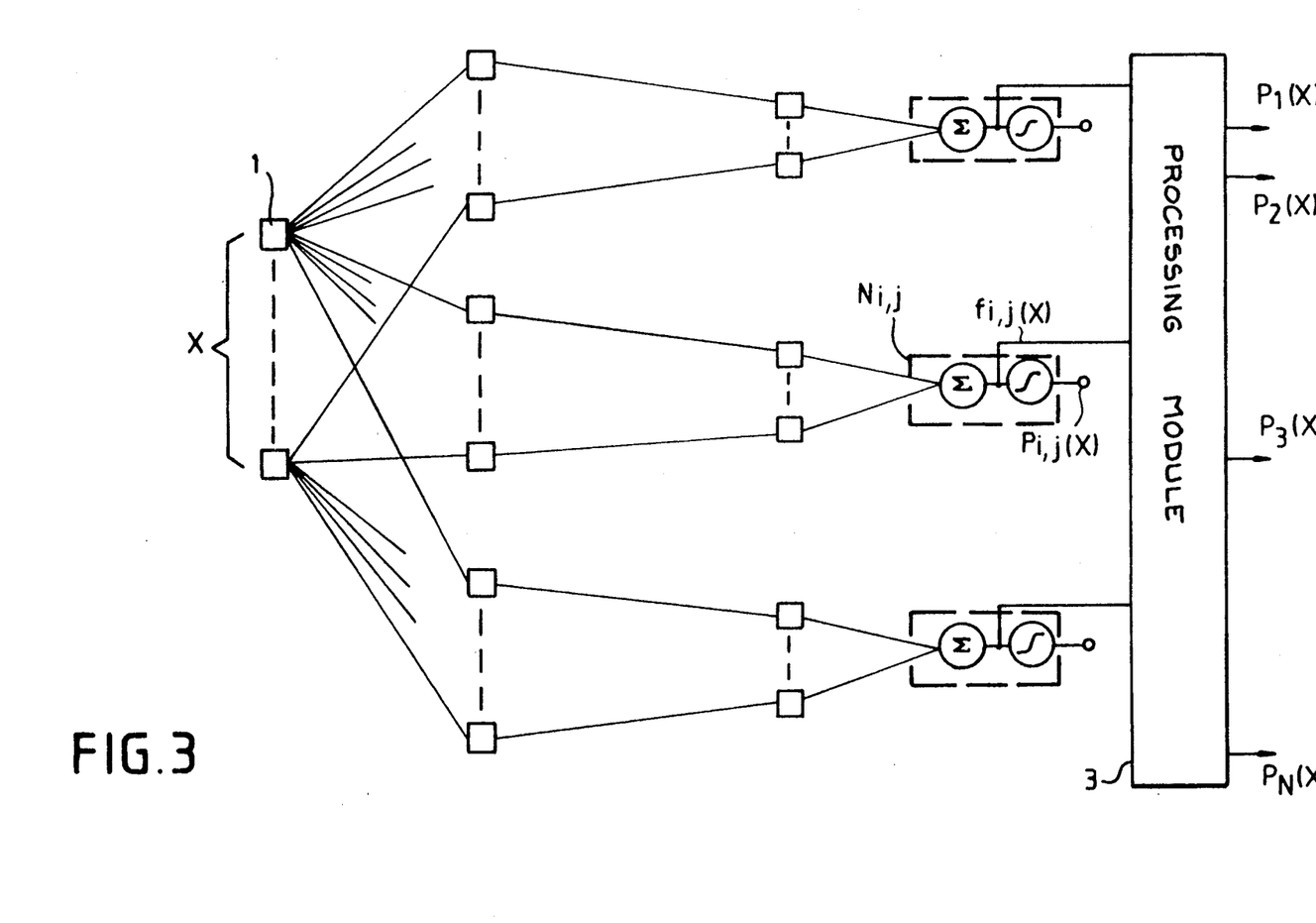
FIG. 3 shows a drawing of a preferred embodiment of a neural system according to the invention.

We then arrive at the preferred embodiment of the invention shown in FIG. 3.

In FIG. 3, the neurons have been represented, by way of an example, on four layers and they are depicted in the form of small squares as indicated by the reference 1. With respect to the neurons of the last layer, the adder circuits SP are distinguished from the threshold circuits CS and it is assumed that the threshold function is a sigmoid function of the type $e^x/(1 + e^x)$.

There are P distinct neural networks all receiving the same input vectors. The term "input vector" refers to a set of signals to be processed by the neural network. This set respesents the object X to be classified. Each neural network has a respective output neuron $N_{i,j}$ giving:

at the output of the weighted adder SP the function $f_{i,j}(X)$ and at the output of the threshold circuit the probability $P_{i,j}(X)$ of membership of the object X in a class $C_i$ among two classes $C_i$ and $C_j$. The values $P_{i,j}$ and $f_{i,j}$ are then related by the relationship (6).

It is recalled that, if the threshold circuit is not of the sigmoid type, the functions $f_{i,j}$ have to be constituted from the $P_{i,j}$ by a specific circuit establishing the relationship (6).

The P outputs giving the functions $f_{i,j}$ are applied as input signals to P inputs of a processing module 3 that has N outputs (one per possible class). On these N outputs, the respective probabilities of membership of the object X in the different classes $C_1$ to $C_N$ are established, this being done as a function of the relationships relating the probabilities of classification in n classes to the probabilities of classification in N classes.

Figure 4:
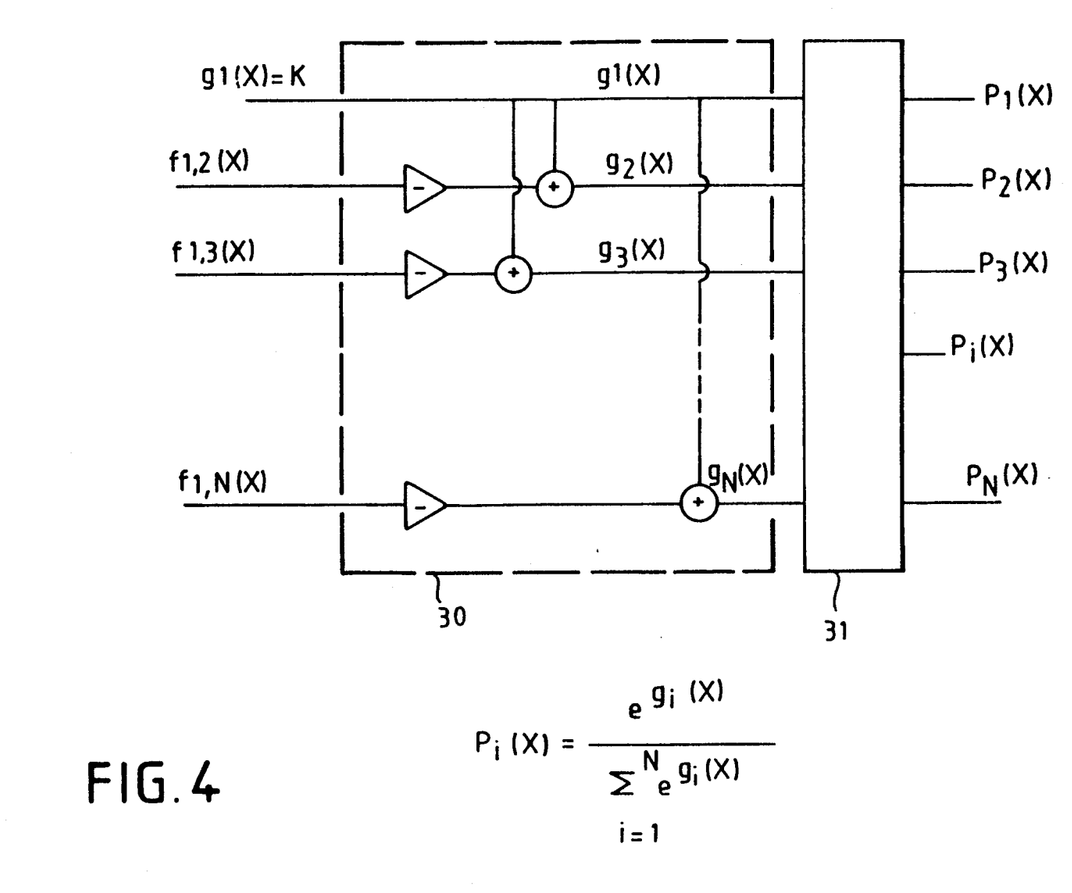
FIG. 4 shows a possible embodiment of a processing module connected to the output of the neural system.

FIG. 4 makes it possible to specify the constitution of the processing module (3) in the simple case that is described as a preferred example with n=2. It is assumed, for example, that the P neural networks give functions $f_{1,2}(X)$, $f_{1,3}$, ..., $f_{1,N}(X)$, but they could also provide other functions such as $f_{2,3}$ etc., the only condition being that the functions provided make it possible, in the graph of FIG. 2, to describe enough closed loops to bring all the indices from 1 to N into play. It is the loops described that will define the linear combinations enabling us to go from the $f_{i,j}(X)$ to the $g_i(X)$.

In the example described in FIG. 4, an arbitrary signal value (current or voltage for example) is established. This value will define one of the functions $g_i(X)$. For example, $g_1(X)$ is arbitrarily taken to be equal to K.

The module includes algebraic addition circuits 30 to establish the following linear combinations on the basis of $g_1$ and the $f_{1,i}$:

$$g_i(X) = g_1(X) - f_{1,i}(X) \text{ for all the "i"s.}$$

And then, on the basis of the simple linear combinations thus obtained, the processing module includes a non-linear standardization circuit making it possible to go again to the probabilities $P_i(X)$ constituting the outputs of the module. According to the formula (11) it is recalled that, in the preferred embodiment of the invention, the function of non-linear standardization will be:

$$P_i(X) = e^{g_i(X)}/[\text{sum of the } e^{g_i(X)}, \text{ for } i = 1 \text{ to N}]$$

It is done in a non-linear transformation circuit schematized by a block referenced 31 that receives the different linear combinations $g_i(X)$ established in the module. The outputs of the circuit 31 are the outputs of the neural system according to the invention. They may themselves be processed by a comparison circuit defining, by the rule of the maximum, the final result of a classification in N classes.

The learning process undergone by the neural system of the invention will be effected by the individual learning by each of the P neural networks, the learning base including input vectors and desired classes (in classification in two possible classes only) for the objects represented by these vectors. The module 3 is not used during this phase. The outputs $P_{i,j}(X)$ are used for this phase. After learning, in an object recognition phase, the module 3 is connected to the outputs giving the $f_{i,j}(X)$ and giving the desired results of classification in N classes.

The choice of the pairs of classes $C_i$, $C_j$ defining the tasks of each of the P neural networks may be determined either arbitrarily (provided that all the indices 1 to N are used and that the desired closed loops can be set up in the graph of FIG. 2) or as a function of the specific problem of classification to be resolved. It may be advantageous to make certain comparisons $C_i$, $C_j$ rather than others to facilitate the solution to the problem of overall classification in N classes.

Besides, it may happen that the rules governing the choice of the functions $f_{i,j}(X)$ and $g_i(X)$, given on a rigorous basis in the simple example described here above, are not easy to implement, so that it is not possible to make a perfect plotting of a graph such as the one of FIG. 2: the functions $f_{i,j}$ do not truly meet the condition leading to a graph of potentials where the flow of the interactions along any closed loop is null. In this case all that has to be done is to draw up a graph that, as far as possible, approaches a graph meeting this condition. There are criteria of optimization enabling this type of problem to be resolved.

For example, it is possible to envisage a case where the partial probabilities $P_{i,j}$ are all learned independently, so that they are not related to the final probabilities $P_i$ by the above-defined equations. It is then quite possible to use the root-mean-square criterion to minimize, along the loops of the graph, the quadratic difference between the function $f_{i,j}(X)$ and the "difference in potential" $g_i(X) - g_j(X)$ to set up interactions $f_{i,j}$ that come as close as possible to a graph where the flows of the interactions are null along the closed loops.

This optimization makes it possible to arrive at a a quite explicit determination (hence one that can be achieved by an electronic circuit) of the value $g_i(X)$ as a function of the values $f_{i,j}(X)$. In one example of quadratic optimization of the differences between the interactions $f_{i,j}$ and the "potential differences" $g_i - g_j$, it has been found that it is necessary to establish functions $g_i(X)$ such that $2Ng_i(X)$ is the sum of all the differences (which are not null according to this assumption) $f_{i,j}(X) - f_{i,j}(X)$ for $j = 1$ to N. This explanation simply shows that the approach of the invention can be applied (but in a more complex way) even when only an approximate deduction can be made of the results of classification $P_i$ in N classes on the basis of the results of partial classification $P_{i,j}$ in 2 or n classes.

Another potential advantage of this module has been cited: the possibility of adding a new class without requiring a total re-learning process. Indeed, the addition of a new class is expressed, on the learning graph, by the appearance of a new node. To rebuild a completely connected graph, it is enough to know one of the interactions of this node with one of the nodes of the graph and to deduce all the missing interactions (or, in what amounts to the same thing, the value of the potential of this node). This approch corresponds to learning in the case of a graph where the flow is really null along the closed loops. The second approach (when the first one is not possible) consists in learning all the interactions between this new class and the old classes. Interpreted on the graph, this amounts to determining all the interactions between this new node and the nodes of the graph, and in applying the above-described rule of determination of the potentials $g_i(X)$. It will be observed, in particular, that this new determination of the potentials $g_i(X)$ may be written as a variation with respect to the formerly existing potentials.

It must now be noted that, as a rule, there is no basis for asserting that the process of learning on the $N-1$ sub-networks (hence in pairs of classes) provides for error-free learning in the entire learning system constituted by all the classes once these sub-networks are connected, as proposed herein, by the processing module 3. Several approaches are possible: either the N classes can be divided into P pairs of classes by implementing data analysis methods or a second learning operation can be carried out (advanced learning) once the sub-networks are connected.

First Case

In the first case it is possible, for example, to compute the distances between the centers of gravity of the N classes and carry out the dividing or partitioning by pairs of classes, as follows:
(1) choosing the pair of classes which are closest to each other and determining the interconnection on the graph corresponding to this pair;
(2) choosing the pair of classes closest to each other among the remaining classes (not connected to the graph) and determining the interconnection on the graph corresponding to this pair;
(3) deducing the possible interactions $f_{i,j}$;
(4) returning to the step No. 2 if the graph is not totally connected; if not: the procedure is ended.

It may be noted that the distances among classes that have just been considered may be distances re-standardized by the variance among classes, as is the general practice in data analysis (see: R. O. Duda and P. E. J. Hart, *Pattern Classification And Scene Analysis*, Wiley and Sons, New York, 1973).

Second Case

The idea here is simpler and more general: the learning done by pairs of classes is considered to be a pre-learning process that determines the initial values for a second learning process (advanced learning) once the sub-networks are connected. If certain objects are wrongly classified, this would correspond to interactions on the graph that will have been wrongly determined and hence to errors among pairs of classes not learned through the pair-based procedure. The situation will therefore not be the general one where an object has to be classified in its class against all the classes, but a situation where it will have to be classified in its class only against the classes that have permitted this wrong classification. It will therefore be understood that the pre-learning by pair should improve the learning process as compared with what is generally the case. A learning operation will therefore be carried out first of all without the module 3 through a learning base bringing into play desired results of classification by pairs of classes (or by groups of n classes). Then an additional learning operation will be done, with the processing module 3 and with a learning base bringing into play desired results of classification in N classes.

What is claimed is:

1. A neural system adapted to operate in a learning phase and a post-learning phase for performing object recognition by the classification of objects in N classes, comprising:

P distinct neural networks, wherein each neural network P includes input layer neurons for receiving a first input signal representing an object X to be classified and an output layer neuron comprising a first circuit for performing a weighted addition function on a received signal to produce a first output signal and a second circuit for performing a saturating non-linear function on said first output signal to produce a second output signal for use during the learning phase representing a probability that the object X belongs to a class $C_i$ among n of the N classes, n being greater than 1 and smaller than N, and a signal processing module connected to the P neural networks for receiving during the post-learning phase of object recognition, the first output signals produced by the output layer neurons of the P neural networks, and for producing output signals representing probabilities that object X belongs to class i among N classes.

2. A neural system according to claim 1, wherein the second output signal produced by the output layer neurons of each of the P neural networks represents a probability of classifications of objects in n=2 possible classes, all the N classes being represented in the P networks.

3. A system according to claim 2, wherein the number of networks is P=N−1.

4. A system according to claim 3, wherein the second output signals produced by the output layer neurons of the P neural networks represent probabilities $P_{i,j}(X)$ that an object X belongs to the class $C_i$ among only two possible classes $C_i$ and $C_j$, and the first output signals produced by the output layer neurons of the P neural networks represent values $f_{i,j}(X)$ where $$f_{i,j}(X) = \log(P_{i,j}(X)) - \log(1 - P_{i,j}(X))$$

where i and j are indexes.

5. A system according to claim 1, wherein the saturating non-linear function of said second circuit is a sigmoid function having the form $e^x/(1+e^x)$.

6. A neural system according to claim 1, wherein said processing module comprises a third circuit for performing linear combinations of signals and producing output signals representing the linear combinations obtained, and a fourth circuit for performing non-linear standardization on the output signals representing the linear combinations obtained and producing N outputs, the sum of which is constant, each of these N outputs representing a probability that the object X belongs to a respective class among N classes.

7. A neural system according to claim 6, wherein the linear combinations have the form $g_i(X) = g_j(X) + f_{i,j}(X)$ where $g_i(X)$ is a linear combination having an index i, $g_j(X)$ is another linear combination having an index j and $f_{i,j}(X)$ is a value directly related to the value of the second output signal of said output neuron representing the probability that the object X belongs to the class $C_i$ among only two possible classes $C_i$ and $C_j$.

8. A neural system according to claim 7, wherein the non-linear standardization function of said fourth circuit has the form:

$$P_i(X) = e^{g_i(X)}/.$$

9. A method for the classification of objects in N classes by a neural system comprising the steps of:
learning a configuration of each of a plurality of neural networks P on the basis of input vectors representing an object X to be classified and results from each of the P neural networks of classification in n classes without using a processing module; and performing operating phases after learning by using a processing module to obtain the results of classification into N classes from the results of classification in n classes by the P networks.

10. A method according to claim 9, wherein the learning phase of the P networks is followed by a phase for additional learning by the system, the step comprising connecting the processing module with a learning base.

11. A neural system adapted to operate in a learning phase and a post-learning phase for performing object recognition by the classification of objects in N classes, comprising:
a plurality of neural networks P including means for receiving an input signal representing an object X to be classified and means, connected to said first input signal receiving means, for producing an output signal for use during the learning phase representing a probability that the object X belongs to a class $C_i$ among n of the N classes, n being greater than 1 and smaller than N, and means, connected to said output signal producing means, for processing said output signal during the post-learning phase to produce N output signals representing probabilities that the object X belongs to class i among N classes.

12. A method for the classification of objects in N classes by a neural system, said neural system having P configurable neural networks and a processing module to which each of the P neural networks is connected to process signals produced by the P neural networks, said method comprising the steps of:
configuring each of said P neural networks during a learning phase by using a set of input signals representing known objects and a set of corresponding output probability signals representing desired classification results for those known objects, wherein a probability signal issued from a respective neural network of the neural networks thus configured represents the probability that an object belongs to a given class among a respective subgroup of n classes selected among said N classes, with n greater than 1 and smaller than N, and with all of the N classes being represented in the P configured neural networks,
performing operating phases after learning by using said processing module, wherein input signals representing an object X to be classified are applied to the configured P neural networks, output signals are produced by the P neural networks, said output signals being applied to inputs of said processing module, and processing module signals are produced on outputs of the processing module, said processing module signals each presenting the probability that object X belongs to one class among the N classes.

13. A method according to claim 12, wherein said P neural networks each have a first output and a second output, said second output for supplying said probability signal during the learning phase and during the operating phases, and said first output for supplying a signal based on said probability signal, said first output being connected to said processing module during the operating phases.

14. A method according to claim 13, wherein said second output signal supplies a signal which is a saturated non-linear function of the signal present on the first output.

15. A method according to claim 14, wherein said saturated function is a sigmoid function.

16. A method for the classification of objects in N classes by a neural system, said neural system having P configurable neural networks each having first outputs and second outputs, and a processing module connected to the first outputs for processing signals produced by the P neural networks, said method comprising the steps:

configuring each of said P neural networks during a learning phase by using a set of input signals representing known objects and a set of corresponding output classification signals representing desired classification results for these known objects, wherein a classification signal produced on the second output of a respective neural network of the configured neural networks represents the probability that an object belongs to a given class among a respective subgroup of n classes selected among said N classes, with n greater than 1 and smaller than N, with all of the N classes being represented in the different subgroups corresponding to the different neural networks, performing operating phases after learning by using said processing module, wherein input signals representing an object X to be classified are applied to said P neural networks, output signals are produced at the first outputs of the P neural networks and are applied to the processing module, the output signal issued from a respective neural network having a magnitude based on the probability that the object X belongs to one class among the respective selected group of n classes corresponding to the respective neural network, and end classification signals are produced on outputs of the processing module, said end classification signals representing the probability that the object X belongs to a given class among the N classes.

17. A method according to claim 16, wherein the learning phase of the P neural networks is followed by a phase for additional learning by the system, said additional learning phase comprising the step of connecting the processing module and further configuring the neural networks by using a learning base comprising input signals representing known objects and corresponding end classification signals, said input signals applied to the inputs of the neural networks, and said end classification signals produced on the outputs of the processing module.

18. A neural system adapted to operate in a learning phase and a post-learning phase for performing object recognition by the classification of objects in N classes, comprising P distinct neural networks, each being configured individually and differently, wherein each neural network includes means for receiving a first input signal representing an object X to be classified, and specifically configured processing means connected to said first input signal receiving means, said specifically configured processing means adapted to produce a probability signal representing a probability that the object X belongs to a given class among a respective selected subgroup of n classes, said subgroup selected among the N classes, with n greater than 1 and smaller than N, the processing means of each of the P distinct neural networks being specifically configured so that each of the N classes is represented in the different subgroups corresponding to the P networks, each of said P neural networks further comprising an output for supplying an output signal having a value based on said probability signal, and a signal processing module having P inputs connected to the outputs of the P neural networks for receiving said output signals during the post-learning phase of object recognition, said processing module having means for converting said output signals into N end classification signals representing probabilities that object X belongs to a respective class among the N classes.

19. A neural system according to claim 18, wherein $n=2$.

20. A neural system according to claim 18, wherein $P=N-1$.

21. A neural system according to claim 18, wherein said specifically configured processing means in each neural network comprises means for producing a signal having a value $P_{i,j}(X)$ which is a function of the input signals representing object X, and wherein said output of each of the neural networks supplies an output signal $f_{i,j}(X)$ having an amplitude of the form:

$$\log(P_{i,j}(X)) - \log(1 - P_{i,j}(X)).$$

22. A neural system according to one of claims 18 to 20, wherein each of said P neural networks comprises a first circuit for performing a weighted summation of signals, said first circuit having an output for supplying a sum signal, and a second circuit for performing a saturating non-linear function on the sum signal produced by the first circuit, and wherein the outputs of the first circuit of the different neural networks are connected to the inputs of said signal processing module.

23. A neural system according to claim 22, wherein said signal processing module comprises a third circuit for performing linear combinations of signals, said third circuit having inputs connected to the outputs of said P neural networks and having outputs for producing said linear combinations of signals, and a fourth circuit for performing non-linear standardization of said linear combinations of signals.

24. A neural system according to claim 23, wherein the linear combinations have the form $g_i(X) = g_i(X) + f_{i,j}(X)$ where $g_i(X)$ is a linear combination having an index i, where $i = 1$ to N, $g_j(X)$ is a linear combination having an index j, where $j = 1$ to N, and $f_{i,j}(X)$ is a signal produced on the output of the first circuit of a respective neural network.

25. A neural network according to claim 24, wherein said fourth circuit for performing non-linear standardization produces an output signal $P_i(X)$ having the form:

$$P_i(X) = e^{g_i(X)} / (\text{sum of the } e^{g_i(X)} \text{ for } i = 1 \text{ to N}).$$

26. A neural system according to claim 22, wherein the saturating non-linear function of said second circuit is a sigmoid function having the form $e^x/(1+e^x)$.

* * * * *